(12) United States Patent
Buhler

(10) Patent No.: US 9,453,106 B2
(45) Date of Patent: Sep. 27, 2016

(54) SCRATCH-RESISTANT, TRANSPARENT AND TOUGH COPOLYAMIDE MOULDING COMPOUNDS, MOULDED ARTICLES PRODUCED THEREFROM AND USES THEREOF

(71) Applicant: EMS-PATENT AG, Domat/Ems (CH)

(72) Inventor: Friedrich Severin Buhler, Thusis (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 13/898,099

(22) Filed: May 20, 2013

(65) Prior Publication Data

US 2013/0317168 A1 Nov. 28, 2013

(30) Foreign Application Priority Data

May 23, 2012 (EP) ..................................... 12168988

(51) Int. Cl.
*C08L 77/00* (2006.01)
*C08G 69/26* (2006.01)
*C08L 77/06* (2006.01)

(52) U.S. Cl.
CPC ............. *C08G 69/265* (2013.01); *C08L 77/06* (2013.01)

(58) Field of Classification Search
None
See application file for complete search history.

(56) References Cited

U.S. PATENT DOCUMENTS

| | | |
|---|---|---|
| 2,516,585 A | 7/1950 | Pease |
| 3,454,536 A | 7/1969 | Schade et al. |
| 3,600,336 A | 8/1971 | Okada et al. |
| 3,625,788 A | 12/1971 | Bartner |
| 4,036,811 A | 7/1977 | Noetzel et al. |
| 4,076,664 A | 2/1978 | Pagilagan |
| 4,212,777 A | 7/1980 | Goletto |
| 4,322,260 A | 3/1982 | Conlon |
| 4,345,066 A | 8/1982 | Rüter |
| 4,413,921 A | 11/1983 | Fotiu et al. |
| 4,537,949 A | 8/1985 | Schmidt et al. |
| 4,540,772 A | 9/1985 | Pipper et al. |
| 4,603,166 A | 7/1986 | Poppe et al. |
| 4,607,073 A | 8/1986 | Sakashita et al. |
| 4,680,379 A | 7/1987 | Coquard et al. |
| 4,731,421 A | 3/1988 | Hoppe et al. |
| 4,826,951 A | 5/1989 | Coquard et al. |
| 4,831,106 A | 5/1989 | Kempter et al. |
| 4,831,108 A | 5/1989 | Richardson et al. |
| 4,847,356 A | 7/1989 | Hoppe et al. |
| 5,071,924 A | 12/1991 | Koch et al. |
| 5,081,222 A | 1/1992 | Reimann et al. |
| 5,098,940 A | 3/1992 | Brooks |
| 5,177,177 A | 1/1993 | Thullen et al. |
| 5,177,178 A | 1/1993 | Thullen et al. |
| 5,191,060 A | 3/1993 | Akkapeddi et al. |
| RE34,447 E | 11/1993 | Poppe et al. |
| 5,278,231 A | 1/1994 | Chundury |
| 5,302,691 A | 4/1994 | Soelch |
| 5,310,860 A | 5/1994 | Maj et al. |
| 5,342,862 A | 8/1994 | Reich |
| 5,422,418 A | 6/1995 | Maj et al. |
| 5,480,945 A | 1/1996 | Vicik |
| 5,560,398 A | 10/1996 | Pfleger |
| 5,612,446 A | 3/1997 | Presenz et al. |
| 5,674,973 A | 10/1997 | Pipper et al. |
| 5,684,120 A | 11/1997 | Torre |
| 5,686,192 A | 11/1997 | Presenz et al. |
| 5,688,901 A | 11/1997 | Fisch et al. |
| 5,708,125 A | 1/1998 | Liedloff et al. |
| 5,773,556 A | 6/1998 | Kleiner et al. |
| 5,786,086 A | 7/1998 | Frihart et al. |
| 5,807,972 A | 9/1998 | Liedloff et al. |
| 5,917,004 A | 6/1999 | Liedloff et al. |
| 5,957,607 A | 9/1999 | Tsai |
| 6,008,288 A | 12/1999 | Dalla Torre |
| 6,075,116 A | 6/2000 | Moriwaki et al. |
| 6,204,355 B1 | 3/2001 | Dalla Torre et al. |
| 6,255,371 B1 | 7/2001 | Schlosser et al. |
| 6,270,560 B1 | 8/2001 | Kleiner et al. |
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |

(Continued)

FOREIGN PATENT DOCUMENTS

| | | |
|---|---|---|
| CA | 861620 | 1/1971 |
| CA | 1109619 A1 | 9/1981 |

(Continued)

OTHER PUBLICATIONS

"BIAX, ein neuer Prüfkörper" (BIAX, a new inspection piece), published in Noss'Ovra staff magazine, Dec. 2006, No. 12, 29th year, EMS-CHEMIE AG (4 pgs.).
Cramer et al., "Some Isomorphous Copolyamides," *Journal of Polymer Science*, vol. 21, pp. 237-250 (1956).
Dolden, "Structure-property relationships in amorphous polyamides," *Polymer*, vol. 17, pp. 875-892 (1976).
Edgar et al., "The p-Phenylene Linkage in Linear High Polymers: Some Structure-Property Relationships," *Journal of Polymer Science*, vol. 8, No. 1, pp. 1-22 (1952).

(Continued)

*Primary Examiner* — Susannah Chung
*Assistant Examiner* — Robert T Butcher
(74) *Attorney, Agent, or Firm* — Leydig, Voit & Mayer, Ltd.

(57) ABSTRACT

Disclosed are scratch-resistant, transparent and tough copolyamide molding compounds distinguished by high scratch-resistance, excellent transparency and great toughness, which are suitable for producing transparent moulded articles or transparent coatings. The molding compounds are obtained by polycondensation of a carboxylic acid mixture including at least one aliphatic dicarboxylic acid and at least one aromatic dicarboxylic acid with at least one cycloaliphatic diamine. Also disclosed are molded parts or coatings produced from the copolyamide compounds.

17 Claims, No Drawings

(56) References Cited

U.S. PATENT DOCUMENTS

| | | |
|---|---|---|
| 6,547,992 B1 | 4/2003 | Schlosser et al. |
| 6,572,295 B1 | 6/2003 | Chochoy et al. |
| 6,706,790 B1 | 3/2004 | Berliet |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffman et al. |
| 8,044,171 B2 | 10/2011 | Buhler et al. |
| 8,268,956 B2 | 9/2012 | Bühler et al. |
| 8,383,244 B2 | 2/2013 | Bayer et al. |
| 8,507,598 B2 | 8/2013 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0130381 A1 | 7/2003 | Joachimi et al. |
| 2003/0181585 A1 | 9/2003 | Handlin, Jr. et al. |
| 2003/0235666 A1 | 12/2003 | Bühler |
| 2004/0158028 A1 | 8/2004 | Bühler |
| 2004/0230028 A1 | 11/2004 | Sato et al. |
| 2004/0242803 A1 | 12/2004 | Ohme et al. |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffman et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1 | 5/2007 | Rexin et al. |
| 2007/0172614 A1 | 7/2007 | Lee |
| 2007/0222941 A1 | 9/2007 | Sakai |
| 2007/0270544 A1 | 11/2007 | Bühler et al. |
| 2008/0135720 A1 | 6/2008 | Bühler et al. |
| 2008/0167415 A1 | 7/2008 | Stoeppelmann et al. |
| 2008/0207782 A1 | 8/2008 | Jacobs et al. |
| 2008/0274355 A1 | 11/2008 | Hewel |
| 2009/0127740 A1 | 5/2009 | Kirchner |
| 2009/0131569 A1 | 5/2009 | Schwitter et al. |
| 2009/0163634 A1 | 6/2009 | Bühler et al. |
| 2009/0247699 A1 | 10/2009 | Buehler et al. |
| 2010/0022742 A1 | 1/2010 | Bühler et al. |
| 2010/0028646 A1 | 2/2010 | Schwitter et al. |
| 2010/0036043 A1 | 2/2010 | Weber et al. |
| 2010/0130677 A1 | 5/2010 | Amici et al. |
| 2010/0227122 A1 | 9/2010 | Kumazawa et al. |
| 2010/0279111 A1 | 11/2010 | Philipp et al. |
| 2010/0297373 A1 | 11/2010 | Thullen et al. |
| 2010/0311882 A1 | 12/2010 | Eibeck et al. |
| 2011/0105655 A1 | 5/2011 | Harder et al. |
| 2011/0220667 A1 | 9/2011 | Pfleghar et al. |
| 2012/0029133 A1 | 2/2012 | Stoppelmann et al. |
| 2012/0237708 A1 | 9/2012 | Caviezel et al. |
| 2012/0321829 A1 | 12/2012 | Bayer et al. |
| 2014/0094548 A1 | 4/2014 | Roth et al. |
| 2014/0171573 A1 | 6/2014 | Bayer et al. |
| 2014/0275392 A1 | 9/2014 | Bühler |

FOREIGN PATENT DOCUMENTS

| | | |
|---|---|---|
| CA | 2019904 | 1/1991 |
| CH | 280367 | 1/1952 |
| CN | 1167267 A | 12/1997 |
| CN | 1467236 A | 1/2004 |
| CN | 101050303 A | 10/2007 |
| CN | 101357515 A | 2/2009 |
| CN | 101405323 A | 4/2009 |
| CN | 201741455 U | 2/2011 |
| DE | 14 95 393 | 4/1969 |
| DE | 24 47 727 A1 | 4/1976 |
| DE | 26 42 244 A1 | 3/1977 |
| DE | 2821333 A1 | 11/1978 |
| DE | 36 00 015 A1 | 7/1986 |
| DE | 90 01 242 U1 | 2/1991 |
| DE | 40 05 894 A1 | 12/1991 |
| DE | 43 29 676 A1 | 3/1994 |
| DE | 195 13 940 A1 | 1/1996 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59048 A1 | 7/2004 |
| DE | 696 32 529 T2 | 9/2004 |
| DE | 103 16 873 A1 | 11/2004 |
| DE | 103 46 326 A1 | 5/2005 |
| DE | 694 28 832 T3 | 2/2007 |
| DE | 102010023770 A1 | 12/2011 |
| EP | 0 052 944 A1 | 6/1982 |
| EP | 0 129 195 A2 | 12/1984 |
| EP | 0 129 196 A2 | 12/1984 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 325 923 A2 | 8/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 725 101 A1 | 8/1996 |
| EP | 0 792 912 A2 | 9/1997 |
| EP | 0 796 886 A2 | 9/1997 |
| EP | 0 818 491 A2 | 1/1998 |
| EP | 0 725 100 B1 | 3/1998 |
| EP | 0 837 087 A1 | 4/1998 |
| EP | 0 839 862 A1 | 5/1998 |
| EP | 0 976 774 A2 | 2/2000 |
| EP | 0 771 846 B1 | 1/2002 |
| EP | 1 339 096 A2 | 8/2003 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| EP | 2 412 757 A1 | 2/2012 |
| EP | 2 535 365 A1 | 12/2012 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | H05-043799 A | 2/1993 |
| JP | 05-125184 A | 5/1993 |
| JP | 06-511281 T | 12/1994 |
| JP | 08-239469 A | 8/1996 |
| JP | 08-259808 A | 10/1996 |
| JP | 09-078351 A | 3/1997 |

(56) References Cited

FOREIGN PATENT DOCUMENTS

| | | |
|---|---|---|
| JP | 10-168183 A | 6/1998 |
| JP | 10-219026 | 8/1998 |
| JP | 2000-204239 A | 7/2000 |
| JP | 2001-261973 | 9/2001 |
| JP | 2004-083858 | 3/2004 |
| JP | 2006-045390 | 2/2006 |
| JP | 2009-132908 A | 6/2009 |
| JP | 2009-149896 A | 7/2009 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2005/035664 A1 | 4/2005 |
| WO | WO 2006/074934 A1 | 7/2006 |
| WO | WO 2006/122602 A1 | 11/2006 |
| WO | WO 2007/080754 A1 | 7/2007 |
| WO | WO 2007/087896 A1 | 8/2007 |
| WO | WO 2009/062692 A2 | 5/2009 |
| WO | WO 2009/095440 A1 | 8/2009 |
| WO | WO 2009/156323 A2 | 12/2009 |
| WO | WO 2012/168442 A1 | 12/2012 |
| WO | WO 2013/163012 A1 | 10/2013 |
| WO | WO 2013/188302 A1 | 12/2013 |
| WO | WO 2013/188323 A1 | 12/2013 |
| WO | WO 2013/188488 A1 | 12/2013 |

OTHER PUBLICATIONS

Henkel Corporation, "Empol Dimer and Polybasic Acids: Technical Bulletin 114C," (1997).

Laura et al., "Effect of rubber particle size and rubber type on the mechanical properties of glass fiber reinforced, rubber-toughened nylon 6," *Polymer*, vol. 44, No. 11, pp. 3347-3361 (2003).

Levine et al., "Isomorphous Replacement in a Copolyamide System," *Journal of Polymer Science*, Issue XLIX, pp. 241-246 (1961).

Unichema International, "Pripol C36-Dimer Acid."

Yu et al., "Isomorphous Replacement in a Copolyamide System: Homologs of Adipic and Terephthalic Acids," *Am. Chem. Soc.*, Issue 81, pp. 5361-5365 (1959).

European Patent Office, Extended European Search Report in European Patent Application No. 12168988.9 (Sep. 6, 2012).

Japanese Patent Office, Notification of Reasons for Refusal in Japanese Patent Application No. 2013-102888 (Jul. 30, 2014).

Japanese Patent Office, Notification of Reasons for Refusal in Japanese Patent Application No. 2013-102888 (Apr. 22, 2015).

State Intellectual Property Office of the People's Republic of China, First Office Action in Chinese Patent Application No. 201310195776.9 (Apr. 29, 2015).

State Intellectual Property Office of the People's Republic of China, Second Office Action in Chinese Patent Application No. 201310195776.9 (Dec. 11, 2015).

State Intellectual Property Office of the People's Republic of China, Third Office Action in Chinese Patent Application No. 201310195776.9 (Apr. 1, 2016).

European Patent Office, Notice Pursuant to Article 94(3) EPC in European Patent Application No. 12 168 988.9 (Jul. 5, 2016).

Directorate General of Intellectual Property Rights (DGIP) of Indonesia, Office Action in Indonesian Patent Application No. P-00201300352 (Jul. 18, 2016).

SCRATCH-RESISTANT, TRANSPARENT AND TOUGH COPOLYAMIDE MOULDING COMPOUNDS, MOULDED ARTICLES PRODUCED THEREFROM AND USES THEREOF

CROSS-REFERENCE TO A RELATED APPLICATION

This patent application claims the benefit of European Patent Application No. EP 12 168 988.9, filed May 23, 2012, the disclosure of which is incorporated herein by reference.

FIELD OF THE INVENTION

The invention relates to scratch-resistant, transparent and tough copolyamide moulding compounds which are distinguished by high scratch-resistance, excellent transparency and great toughness. With the transparent amorphous copolyamide moulding compounds according to the invention, transparent moulded articles or transparent coatings which have in addition excellent mechanical properties can be produced. The transparent amorphous copolyamide moulding compounds according to the invention are obtained by polycondensation of a carboxylic acid mixture, comprising or consisting of at least one aliphatic dicarboxylic acid with 6 to 18 carbon atoms and at least one aromatic dicarboxylic acid, selected from the group consisting of isophthalic acid, terephthalic acid and/or naphthalenedicarboxylic acid and at least one cycloaliphatic diamine, selected from the group consisting of 3,3'-dimethyl-4,4'-diaminocyclohexylmethane (DMDC), 3,3',5,5'-tetramethyl-4,4'-diaminocyclohexylmethane, 2,2',3,3'-tetramethyl-4,4'-diaminocyclohexylmethane and/or norbornanediamine. The invention relates furthermore to moulded parts or coatings produced herefrom and also to the use of the transparent amorphous copolyamide moulding compounds for the production of transparent moulded articles or transparent coatings which are used in particular in the fields of industry, the household, sanitary equipment, optics, clocks, electrics, electronics, lighting, automotive vehicles, mechanical engineering, packaging, fashion, textiles, sport and leisure, measuring and testing means, toys and design.

Transparent amorphous copolyamide moulding compounds and transparent amorphous polyamide moulded articles which can be produced therefrom are known in the state of the art. Basically, two types of polymer are thereby differentiated in the field of transparent polyamides, and in fact, on the one hand, microcrystalline transparent polyamides and also amorphous transparent polyamides.

BACKGROUND OF THE INVENTION

Microcrystalline transparent copolyamide moulding compounds and use thereof for spectacle frames, glass for instruments and also covers and lamp covers are known for example from DE 43 10 970 A1. The polyamides described there are produced from 4,4'-diaminocyclohexylmethane as diamine component and dodecanoic acid as acid component.

In EP 1 595 907 A1, transparent amorphous polyamides which are based on diamines and a C14-dicarboxylic acid are furthermore described.

In addition, transparent amorphous polyamides which have inter alia excellent stress-cracking resistance in most solvents are known from EP 0 725 101 A1.

With respect to scratch-resistance, the previously mentioned types of polymer are however disadvantageous. In order to solve this problem, EP 2 093 255 A2 proposes equipping transparent polyamides to be scratch-resistant by means of special additives.

WO 2008/025703 A1 describes copolyamide moulding compounds as coating of polycarbonate. Consequently, objects which are stress-cracking-insensitive, scratch-resistant and abrasion-resistant are made possible. The polyamides are described in more detail from page 2, line 6, it not being disclosed whether the mentioned polyamides concern transparent or opaque polyamides.

It has now been shown that the already known transparent copolyamide moulding compounds do have however disadvantages. It has emerged in particular that the scratch-resistance of the moulded articles produced from the transparent copolyamide moulding compounds is not always satisfactory. The copolyamide moulding compound should have as high a scratch-resistance as possible in order to ensure in particular a long lifespan and sustained transparency of the moulded articles produced herefrom. It is thereby essential that also the mechanical properties of the produced moulded articles are high, above all the toughness, e.g. described by the notch impact strength, the breaking elongation and/or the impact strength. Furthermore, it is essential for the transparent moulded articles that they have as high a transparency as possible. The copolyamide moulding compounds known to date have not corresponded to these requirements in their entirety.

SUMMARY OF THE INVENTION

It was hence the object of the present invention to provide a copolyamide moulding compound which has high scratch-resistance and transparency even without the addition of additives. In addition, the copolyamide moulding compound according to the invention should likewise be distinguished by good mechanical properties.

This object is achieved by the features of the copolyamide moulding compound, the moulded part or coating produced from the copolyamide moulding compound described herein, and the advantageous developments thereof. Uses according to the invention are also described.

DETAILED DESCRIPTION OF THE INVENTION

According to the invention, a transparent, scratch-resistant and tough copolyamide moulding compound is hence provided, which can be produced by polycondensation of at least one cycloaliphatic diamine, selected from the group consisting of 3,3'-dimethyl-4,4'-diaminocyclohexylmethane (DMDC), 3,3',5,5'-tetramethyl-4,4'-diaminocyclohexylmethane, 2,2',3,3'-tetramethyl-4,4'-diaminocyclohexylmethane and/or norbornanediamine with a dicarboxylic acid mixture, consisting of or comprising at least one aliphatic dicarboxylic acid with 6 to 18 carbon atoms and at least one aromatic dicarboxylic acid, selected from the group consisting of isophthalic acid, terephthalic acid and/or naphthalenedicarboxylic acid. The copolyamide moulding compound according to the invention is distinguished, surprisingly, by high scratch-resistance which is greater than or equal to the pencil hardness grade H, preferably greater than or equal to grade 2H, measured according to ASTM D3363-05 on conditioned test plates.

It has now been shown that only by selecting these specific components are transparent amorphous copolyamide moulding compounds obtained, which have properties which are clearly superior in their entirety relative to the moulding compounds known in the state of the art.

Transparent hereby means a light transmission, measured according to ASTM D1003, at a test piece thickness of 2 mm of at least 80%, preferably of at least 90%.

Amorphous hereby means a heat of fusion, measured according to ISO 11357, of at most 5 J/g, preferably at most 3 J/g and particularly preferred at most 1 J/g.

The invention thereby also includes mixtures. There should be understood by mixtures, both blends of the above-described copolyamide moulding compounds according to the invention in any mixture ratios and mixtures of the copolyamide moulding compounds according to the invention and/or blends thereof with further polyamides, these further polyamides being comprised at at most 20% by weight, preferably at at most 10% by weight, relative to the total mixture.

These further polyamides can be partially crystalline, microcrystalline or amorphous.

For preference, these further polyamides are selected from the group of polyamides consisting of PA 6, PA 69, PA 610, PA 612, PA 614, PA 1010, PA1212, PA 6/66/12, PA 6/66, PA 6/12, PA 11, PA 12, PA 6I/6T, PA MXDI/6I, PA MXDI/MXDT/6I/6T, PA MACM12, PA MACM14, PA MACM18, PA PACM12, PA PACM14, PA PACM18, PA 6I/6T/MACMI/MACMT, PA 6-3-T, PA MACMI/12, PA MACMT/12, polyether amides, polyether ester amides and mixtures or copolymers thereof.

The relative viscosity (measured according to ISO 307 in m-cresol) of the copolyamide moulding compound according to the invention is 1.35 to 2.15, preferably 1.40 to 2.0, particularly preferred 1.45 to 1.95, very particularly preferred 1.50 to 1.90.

In a preferred embodiment, the copolyamide moulding compound according to the invention has a notch impact strength, measured according to ISO 179 on conditioned test bars, of at least 9 kJ/m$^2$.

It is thereby further advantageous if the copolyamide moulding compound according to the invention has a glass transition temperature, measured according to ISO 11357, of at least 165° C., preferably of 165 to 215° C., particularly preferred of 170 to 210° C., very particularly preferred of 190 to 210° C.

In addition, a stress-cracking resistance in toluene, measured according to DIN 53449 on dry test pieces, of at least 15 MPa is advantageous, preferably of at least 20 MPa, particularly preferred of at least 25 MPa.

A further preferred embodiment of the invention provides that the breaking elongation, measured according to ISO 527 on conditioned test bars, is at least 20%, preferably at least 30%.

Furthermore, it is particularly preferred if the modulus of elasticity in tension, measured according to ISO 527 on conditioned test bars, is at least 1,700 MPa, preferably at least 1,800 MPa, particularly preferred at least 2,000 MPa.

A particularly preferred embodiment of the present invention provides that the cycloaliphatic diamine which is used in the production of the copolyamide moulding compounds according to the invention is selected from the group consisting of 3,3'-dimethyl-4,4'-diaminocyclohexylmethane (DMDC), 3,3',5,5'-tetramethyl-4,4'-diaminocyclohexylmethane, 2,2',3,3'-tetramethyl-4,4'-diaminocyclohexylmethane and mixtures thereof.

A further particularly preferred embodiment of the present invention provides that the cycloaliphatic diamine which is used in the production of the copolyamide moulding compounds according to the invention is selected from the group consisting of 3,3'-dimethyl-4,4'-diaminocyclohexylmethane (DMDC), 3,3',5,5'-tetramethyl-4,4'-diaminocyclohexylmethane and mixtures thereof.

A further particularly preferred embodiment of the present invention provides that the cycloaliphatic diamine which is used in the production of the copolyamide moulding compounds according to the invention is selected from the group consisting of 3,3'-dimethyl-4,4'-diaminocyclohexylmethane (DMDC) and 3,3',5,5'-tetramethyl-4,4'-diaminocyclohexylmethane.

A particularly preferred embodiment of the present invention provides that the aliphatic dicarboxylic acid which is used in the production of the copolyamide moulding compounds according to the invention is selected from the group consisting of dicarboxylic acids with 6, 7, 8, 9, 10, 11, 12, 13 and 14 carbon atoms and mixtures thereof.

A further particularly preferred embodiment of the present invention provides that the aliphatic dicarboxylic acid which is used in the production of the copolyamide moulding compounds according to the invention is selected from the group consisting of dicarboxylic acids with 9, 10, 11, 12, 13 and 14 carbon atoms and mixtures thereof.

A further particularly preferred embodiment of the present invention provides that the aliphatic dicarboxylic acid which is used in the production of the copolyamide moulding compounds according to the invention is selected from the group consisting of dicarboxylic acids with 9, 10, 11 and 12 carbon atoms and mixtures thereof.

A further particularly preferred embodiment of the present invention provides that the aliphatic dicarboxylic acid which is used in the production of the copolyamide moulding compounds according to the invention is selected from the group consisting of azelaic acid (9 carbon atoms), sebacic acid (10 carbon atoms), dodecanoic diacid (12 carbon atoms), tetradecanoic diacid (14 carbon atoms) and mixtures thereof.

It is hereby particularly preferred if merely a single aliphatic dicarboxylic acid is used.

A particularly preferred further embodiment of the present invention provides that the single aliphatic dicarboxylic acid which is used in the production of the copolyamide moulding compounds according to the invention is selected from the group consisting of azelaic acid (9 carbon atoms), sebacic acid (10 carbon atoms), dodecanoic diacid (12 carbon atoms) and tetradecanoic diacid (14 carbon atoms).

In a further embodiment, in the case of the transparent, amorphous copolyamide moulding compounds according to the invention, it is preferred in particular that the single aliphatic dicarboxylic acid which is used in the production of the copolyamide moulding compounds according to the invention is selected from the group consisting of azelaic acid (9 carbon atoms), sebacic acid (10 carbon atoms) and dodecanoic diacid (12 carbon atoms).

In a further embodiment, in the case of the transparent, amorphous copolyamide moulding compounds according to the invention, in particular azelaic acid (9 carbon atoms) is preferred.

In a further embodiment, in the case of the transparent, amorphous copolyamide moulding compounds according to the invention, in particular sebacic acid (10 carbon atoms) is preferred.

In a further embodiment, in the case of the transparent, amorphous copolyamide moulding compounds according to the invention, in particular dodecanoic diacid (12 carbon atoms) is preferred.

Furthermore, it is preferred that the mixture used for the polycondensation of the at least one aliphatic dicarboxylic acid and the at least one aromatic dicarboxylic acid consists at a) 15 to 38% by mol, preferably 20 to 36% by mol, particularly preferred 20 to 30% by mol, of at least one aliphatic dicarboxylic acid, and at b) 12 to 35% by mol, preferably 14 to 30% by mol, particularly preferred 20 to 30% by mol, of at the least one aromatic dicarboxylic acid.

In the case of the previously indicated quantity data of the monomers of the copolyamides according to the invention, the proportions of all the monomers add up to 100% by mol, the molar proportion of the diamine being equal to the sum of the molar proportions of the dicarboxylic acids. In this respect, further monomers, in particular lactams, and/or ω-aminocarboxylic acids are ruled out.

The above-mentioned quantity data with respect to the dicarboxylic acids—and also all further quantity data of the dicarboxylic acids or diamines—should thereby be understood such that a corresponding molar ratio of these educts used during the polycondensation is also found again in the copolyamide moulding compounds produced in this way by polycondensation.

The aliphatic dicarboxylic acids preferably concern linear aliphatic dicarboxylic acids and not cycloaliphatic dicarboxylic acids.

The at least one aromatic dicarboxylic acid, in a preferred embodiment, is selected from isophthalic acid, terephthalic acid or naphthalenedicarboxylic acid alone or represents a mixture of isophthalic acid and terephthalic acid, isophthalic acid and naphthalenedicarboxylic acid or isophthalic acid, terephthalic acid and naphthalenedicarboxylic acid.

In the case of the above-mentioned embodiment, it is thereby particularly preferred if the at least one aromatic dicarboxylic acid is a mixture of isophthalic acid and terephthalic acid and/or naphthalenedicarboxylic acid, the molar ratio of isophthalic acid to terephthalic acid and/or naphthalenedicarboxylic acid being preferably 5:1 to 1:1.2.

Of very particular preference thereby is a copolyamide moulding compound, producible by polycondensation of 3,3'-dimethyl-4,4'-diaminocyclohexylmethane (DMDC) and/or 3,3',5,5'-tetramethyl-4,4'-diaminocyclohexylmethane with a mixture of 1,12 dodecanoic diacid and isophthalic acid and/or terephthalic acid, i.e. a copolyamide moulding compound which consists of repeat units which are derived from the above-mentioned monomers.

For the production of such a copolyamide moulding compound, there are used in particular 50% by mol of 3,3'-dimethyl-4,4'-diaminocyclohexylmethane and/or 3,3',5,5'-tetramethyl-4,4'-diaminocyclohexylmethane and a mixture of 15 to 38% by mol of 1,12-dodecanoic diacid and 12 to 35% by mol of isophthalic acid and/or terephthalic acid, i.e. the proportion of diamine in the copolyamide moulding compound is 50% by mol and the proportion of dicarboxylic acid is 50% by mol.

With respect to the carboxylic acid mixture which is used, it is thereby particularly advantageous if, relative to the sum of all the dicarboxylic acids, corresponding to 50% by mol of the copolyamide moulding compound, the following variants of a carboxylic acid mixture are used so that the copolyamide according to the invention comprises the repeat units derived from the dicarboxylic acids in the following molar quantities:

a) at 20 to 28% by mol, preferably 22 to 26% by mol, of 1,12-dodecanoic diacid and at 22 to 30% by mol, preferably 24 to 28% by mol, of isophthalic acid, b) at 32 to 38% by mol, preferably 34 to 37% by mol, of 1,12-dodecanoic diacid and at 12 to 18% by mol, preferably 13 to 16% by mol, of isophthalic acid, or c) 20 to 28% by mol, preferably 22 to 26% by mol, of 1,12-dodecanoic diacid,
   14 to 25% mol, preferably 16 to 22% by mol, of isophthalic acid
   and
   5 to 16% by mol, preferably 6 to 12% by mol, of terephthalic acid, with the proviso that dodecanoic diacid, isophthalic acid and terephthalic acid are chosen such that the result is 50% by mol.

In the production of the copolyamide according to the invention, the use of lactams and/or α,ω-aminocarboxylic acids is dispensed with, i.e. the copolyamide according to the invention is free of repeat units derived from lactams and/or α,ω-aminocarboxylic acids.

In a specially preferred embodiment, only a single diamine is used in the production of the copolyamide according to the invention.

In a further specially preferred embodiment, the single diamine concerns 3,3'-dimethyl-4,4'-diaminocyclohexylmethane.

In a further specially preferred embodiment, the single diamine concerns 3,3',5,5'-tetramethyl-4,4'-diaminocyclohexylmethane.

According to the invention, a moulded article or a coating is likewise indicated, which comprises a copolyamide moulding compound according to the invention or consists hereof.

Examples of moulded articles according to the invention are thereby correcting lenses, non-correcting lenses, lenses for sunglasses, spectacle bows, spectacle frames, safety glasses, visors, glasses, glass panes, clock glasses, panes for lamps, protective helmets, handles, fasteners, in particular textile fasteners, measuring instruments, flow meters, filter cups, eye protection of all types, decorative parts of all types, magnifying glasses, lens systems, camera lenses, lenses for LEDs, displays, for example for electrical appliances electronic appliances, electrical components or electronic components, e.g. for mobile phones, game consoles, cameras, laser-, distance measuring- or GPS devices, housings for apparatus or objects of every kind, e.g. for portable telephones with or without integrated displays, clocks, lamps, filters, CDs or DVDs, optical waveguides, light couplers, light amplifiers, light diffusers, protective covers for optical waveguides and mono- or multilayer films, containers or tubes.

The copolyamide moulding compounds according to invention are likewise suitable for the production of the above-mentioned moulded articles.

The copolyamide moulding compounds according to the invention can be used above all in the fields of industry, the household, sanitary equipment, optics, clocks, electrics, electronics, lighting, automotive vehicles, mechanical engineering, packaging, fashion, textiles, sport and leisure, measuring and testing means, toys and design for the production of transparent moulded articles or transparent coatings.

The copolyamide moulding compounds according to the invention can of course, as already known per se in the state of the art, comprise additives.

There can be added to the copolyamide moulding compounds according to the invention, 0 to 6% by weight, preferably 0.005 to 6% by weight, particularly preferred 0.01 to 5% by weight, of additives, relative to the total copolyamide moulding compound. The quantity of each individual additive is at most 3% by weight.

In a further very particularly preferred embodiment, there can be added to the copolyamide moulding compound, 0.01 to 4% by weight of additives, the quantity of each individual additive being at most 3% by weight.

Preferred additives are selected from the group consisting of condensation catalysts, chain regulators, defoamers, inorganic stabilisers, organic stabilisers, lubricants, colourants, marking agents, pigments, photochromic colourants, antistatic agents, mould-release agents, optical brighteners, natural layer silicates, synthetic layer silicates and mixtures thereof.

Adjustment of the relative viscosity and hence of the molar mass of the copolyamide moulding compounds according to the invention can be effected, in a manner known per se, e.g. via monofunctional amines or carboxylic acids and/or difunctional diamines or dicarboxylic acids as chain regulators. Preferred chain regulators are benzoic acid, acetic acid, propionic acid or 2,2,6,6-tetramethyl-4-piperidineamine.

There can be used as stabilisers or ageing-protection agents in the copolyamide moulding compounds according to the invention, e.g. antioxidants, antiozonants, light-stability agents, UV stabilisers, UV absorbers or UV blockers.

The additives can be added directly to the copolyamide moulding compounds or as a master batch with preferably polyamide as carrier material. This can take place in a manner known per se, e.g. during the polycondensation or subsequently in an extrusion.

EXAMPLE

The present invention is described in more detail with reference to the subsequent examples and embodiments without restricting the invention to the concretely represented parameters.

Production of the transparent copolyamides according to the invention is effected, in a manner known per se, in known, stirrable pressure autoclaves with a recipient vessel and a reaction vessel:

In the recipient vessel, deionised water is present and the monomers and additives added. Thereafter, inertisation takes place several times with nitrogen gas. With agitation, heating takes place to 180 to 230° C. at the adjusting pressure in order to obtain a homogeneous solution. This solution is pumped through a filter into the reaction vessel and heated there to the desired reaction temperature of 260 to 350° C. at a pressure of at most 30 bar. The batch is kept at the reaction temperature in the pressure phase for 2 to 4 hours. In the subsequent expansion phase, the pressure is reduced to atmospheric pressure within 1 to 2 hours, the temperature being able to drop slightly.

In the following degassing phase, the batch is kept at a temperature of 270 to 350° C. for 0.5 to 1 hour at atmospheric pressure. The polymer melt is discharged in strand form, cooled in the water bath at 15 to 80° C. and granulated. The granulate is dried for 12 hours at 80 to 120° C. under nitrogen or in a vacuum to a water content of less than 0.1% by weight.

For the production of the copolyamides described in the examples and comparative examples, the following monomers (Table 1) and additives (Table 2) are used:

TABLE 1

| Monomer | Melting range [° C.] | Manufacturer |
| --- | --- | --- |
| 3,3'-dimethyl-4,4'-diaminodicyclo-hexylmethane | −7 to −0.6* | BASF AG, Germany |
| dodecanoic diacid | 128 to 132 | Invista Nederland B.V., Netherlands |
| isophthalic acid | 345 to 348 | Flint Hills Resources, Switzerland |
| terephthalic acid | >400 | BP Amoco Chemical Company, USA |
| laurinlactam | 149 to 153 | EMS-CHEMIE AG, Switzerland |

*Freezing range according to ASTM D1015-55

TABLE 2

| Additive | Product | Manufacturer |
| --- | --- | --- |
| Chain regulator | benzoic acid | SysKem Chemie GmbH, Germany |
| Condensation catalyst | phosphonic acid | Honeywell Speciality Chemicals, Germany |
| Defoamer | Antifoam RD 10% by weight of emulsion | Dow Corning S.A., Belgium |

The measurements were implemented according to the following standards and on the following test pieces.

Modulus of elasticity in tension:
ISO 527 with a tensile speed of 1 mm/min
ISO tensile bar, standard: ISO/CD 3167, type A1, 170×20/10×4 mm
Temperature 23° C.

Tearing strength and breaking elongation:
ISO 527 with a tensile speed of 50 mm/min
ISO tensile bar, standard: ISO/CD 3167, type A1, 170×20/10×4 mm
Temperature 23° C.

Impact strength according to Charpy:
ISO 179/*eU
ISO test bar, standard: ISO/CD 3167, type B1, 80×10×4 mm
Temperature 23° C.
*1=not instrumented, 2=instrumented Notch impact strength according to Charpy:
ISO 179/*eA
ISO test bar, standard: ISO/CD 3167, type B1, 80×10×4 mm
Temperature 23° C.
*1=not instrumented, 2=instrumented Glass transition temperature (Tg), melting point and heat of fusion:
ISO standard 11357
Granulate
Differential scanning calorimetry (DSC) was implemented with the apparatus DSC 2920 of the company TA Instruments at a heating rate of 20 K/min and a cooling rate of 5 K/min. The thermogram was evaluated with the programme Universal Analysis 2000 of the company TA Instruments. The middle of the glass transition range which is indicated as glass transition temperature was determined according to the "half height" method.

Stress-cracking resistance:
DIN 53449
ISO test bar, standard ISO/CD 3167, type A1, 170×20/10×4 mm
Temperature 23° C.

For conversion of the measured outer fibre strain into a tension, the obtained percentage value is multiplied by the modulus of elasticity in tension (dry, MPa) of the measured material.

Transparency:
ASTM D 1003
Round plate, thickness 2 mm, radius 37.5 mm
Temperature 23° C.
Measuring apparatus Haze Gard plus of the company Byk Gardner with CIE light type C. The light transmission value is indicated in % of the irradiated light quantity.
Scratch-resistance:
ASTM D3363-05
ISO test plate, standard: ISO 294-3, type D2, 60×60×2 mm
Temperature 23° C.
The determination is effected by means of a scratch hardness tester model 291 of the company Erichsen and a set of Koh-I-Nor 1500 pencils.
Relative viscosity
ISO 307
0.5 g in 100 ml solvent in m-cresol
Temperature 20° C.

Calculation of the relative viscosity (RV) according to $RV=t/t_0$ following section 11 of the standard.

The test pieces are produced on an injection moulding machine of the company Arburg, Model Allrounder 420 C 1000-250. Cylinder temperatures between 170 and 260° C. are thereby used. The mould temperature is 80° C. In the case of the plates for the transmission measurement and the scratch-resistance determination, polished moulds are used.

If conditioned test pieces are used, they are stored for conditioning according to ISO 1110 for 14 days at 72° C. and 62% relative humidity. If the test pieces are used in the dry state (when measuring the stress-cracking resistance and the transmission), they are stored after the injection moulding for at least 48 h at room temperature in a dry environment, i.e. over silica gel.

In Tables 3 and 4 illustrated below, the examples according to the invention (Table 3) and comparative examples (Table 4) are compared.

TABLE 3

|  | Unit | Examples 1 | Examples 2 | Examples 3 | % by wt. |
|---|---|---|---|---|---|
| Component |  |  |  |  |  |
| 3,3'-dimethyl-4,4'-diaminodicyclohexylmethane | % by mol | 50 | 50 | 50 | 99.7 |
| dodecanoic diacid | % by mol | 23 | 36 | 23 |  |
| isophthalic acid | % by mol | 27 | 14 | 19 |  |
| terephthalic acid | % by mol | — | — | 8 |  |
| chain regulator | % by wt. | 0.25 | 0.25 | 0.25 | 0.3 |
| condensation catalyst | % by wt. | 0.03 | 0.03 | 0.03 |  |
| defoamer | % by wt. | 0.02 | 0.02 | 0.02 |  |
| Values |  |  |  |  |  |
| impact strength, 23° C., conditioned | kJ/m² | 130 | nb* | nb* |  |
| notch impact strength, 23° C., conditioned | kJ/m² | 10 | 12 | 12 |  |
| scratch-resistance, conditioned | — | 2H | H | 2H |  |
| stress-cracking resistance in toluene, dry | MPa | 26 | 22 | 38 |  |
| glass transition temperature | ° C. | 201 | 178 | 205 |  |
| modulus of elasticity in tension, conditioned | MPa | 2,170 | 1,835 | 2,125 |  |
| breaking elongation, conditioned | % | 32 | 101 | 91 |  |
| transparency, 2 mm, dry | % | 93.3 | 93.5 | 93.2 |  |

*no breakage

TABLE 4

|  | Unit | Comparative examples 4 | Comparative examples 5 | Comparative examples 6 | Comparative examples 7 | Comparative examples 8 | % by wt. |
|---|---|---|---|---|---|---|---|
| Component |  |  |  |  |  |  |  |
| 3,3'-dimethyl-4,4'-diaminodicyclohexylmethane | % by mol | 50 | 50 | 50 | 33 | 39 | 99.7 |
| dodecanoic diacid | % by mol | 50 | 45 | 10 | — | 18 |  |
| isophthalic acid | % by mol | — | 5 | 40 | 33 | 15 |  |
| terephthalic acid | % by mol | — | — | — | — | 6 |  |
| laurinlactam | % by mol | — | — | — | 34 | 22 |  |
| chain regulator | % by wt. | 0.25 | 0.25 | 0.25 | 0.25 | 0.25 | 0.3 |
| condensation catalyst | % by wt. | 0.03 | 0.03 | 0.03 | 0.03 | 0.03 |  |
| defoamer | % by wt. | 0.02 | 0.02 | 0.02 | 0.02 | 0.02 |  |
| Values |  |  |  |  |  |  |  |
| impact strength, 23° C., conditioned | kJ/m² | nb* | nb* | 50 | nb* | nb* |  |
| notch impact strength, 23° C., conditioned | kJ/m² | 12 | 12 | 5 | 7 | 10 |  |
| scratch-resistance, conditioned | — | F | F | 2H | HB | F |  |
| stress-cracking resistance in toluene, dry | MPa | 55 | 10 | 35 | 22 | 23 |  |
| glass transition temperature | ° C. | 154 | 160 | 235 | 162 | 162 |  |

TABLE 4-continued

|  | Unit | Comparative examples | | | | | % by wt. |
|---|---|---|---|---|---|---|---|
|  |  | 4 | 5 | 6 | 7 | 8 |  |
| modulus of elasticity in tension, conditioned | MPa | 1,550 | 1,700 | 2,400 | 2,215 | 1,930 |  |
| breaking elongation, conditioned | % | 103 | 100 | 5 | 126 | 115 |  |
| transparency, 2 mm, dry | % | 93.5 | 93.6 | 93.0 | 93.1 | 93.3 |  |

*no breakage

It can be detected that the copolyamides according to the invention have a significantly more balanced property profile than the comparative examples. In particular the scratch-resistance thereby shows better values than the scratch-resistance of the comparative examples. At the same time as the high scratch-resistance, high toughness, measured both as impact strength and notch impact strength, thereby surprisingly is accompanied by excellent stress-cracking resistance and high transparency, also the breaking elongation having excellent values. The copolyamide moulding compounds according to the invention hence have an extremely balanced property profile with high scratch-resistance. Furthermore, also glass transition temperatures above 190° C. can be achieved with the copolyamides according to the invention.

The invention claimed is:

1. A transparent, scratch-resistant and tough copolyamide moulding compound, producible by polycondensation of a cycloaliphatic diamine or a mixture of two or more cycloaliphatic diamines, wherein said cycloaliphatic diamine or a mixture of two or more cycloaliphatic diamines is selected from the group consisting of 3,3'-dimethyl-4,4'-diaminodicyclohexylmethane (DMDC), 3,3',5,5'-tetramethyl-4,4'-diaminocyclohexylmethane, 2,2',3,3'-tetramethyl-4,4'-diaminocyclohexylmethane and norbornanediamine with a carboxylic acid mixture comprising (i) at least one aliphatic dicarboxylic acid with 6 to 18 carbon atoms and (ii) a mixture of isophthalic acid and terephthalic acid, a mixture of isophthalic acid and naphthalene dicarboxylic acid, or a mixture of isophthalic acid and terephthalic acid and naphthalene dicarboxylic acid,
wherein in (ii), the molar ratio of isophthalic acid to terephthalic acid, the molar ratio of isophthalic acid to naphthalene dicarboxylic acid, or the molar ratio of isophthalic acid to terephthalic acid and naphthalene dicarboxylic acid is 5:1 to 1:1.2,
the copolyamide moulding compound having a scratch-resistance of greater than or equal to grade H, measured according to ASTM D3363-05,
wherein the polycondensation is carried out on a polycondensation mixture consisting of a) 15 to 38% by mol of the at least one aliphatic dicarboxylic acid (i) with respect to the total number of moles of the diamine or diamines and the diacids in the polycondensation mixture, b) 12 to 35% by mol of the mixture (ii) of aromatic dicarboxylic acids with respect to the total number of moles of the diamine or diamines and the diacids in the polycondensation mixture, and c) 50% by mol of said diamine or mixture of diamines with respect to the total number of moles of the diamine or diamines and the diacids in the polycondensation mixture.

2. The copolyamide moulding compound according to claim 1, having a notch impact strength of at least 9 kJ/m².

3. The copolyamide moulding compound according to claim 1, having a glass transition temperature of at least 165° C.

4. The copolyamide moulding compound according to claim 1, having a stress-cracking resistance in toluene of at least 15 MPa.

5. The copolyamide moulding compound according to claim 1, having a breaking elongation of at least 20%.

6. The copolyamide moulding compound according to claim 1, having a modulus of elasticity in tension of at least 1,700 MPa.

7. The copolyamide moulding compound according to claim 1, wherein the aliphatic dicarboxylic acid is selected from dicarboxylic acids with 6, 7, 8, 9, 10, 11, 12, 13 or 14 carbon atoms.

8. The copolyamide moulding compound according to claim 1, producible by polycondensation of 3,3'-dimethyl-4,4'-diaminodicyclohexylmethane (DMIDC) and/or 3,3',5,5'-tetramethyl-4,4'-diaminocyclohexylmethane with a mixture of 1,12-dodecanoic diacid and a mixture of isophthalic acid and terephthalic acid.

9. The copolyamide moulding compound according to claim 8, wherein the polycondensation mixture consists of 15 to 38% by mol of 1,12-dodecanoic diacid and 12 to 35% by mol of the mixture of isophthalic acid and terephthalic acid.

10. The copolyamide moulding compound according to claim 8, wherein the polycondensation mixture consists of:)
20 to 28% by mol of 1,12-dodecanoic diacid, 14 to 25% by mol of isophthalic acid and 5 to 16% by mol of terephthalic acid,
with the proviso that dodecanoic diacid, isophthalic acid and terephthalic acid are chosen such that the result is 50% by mol.

11. A moulded article or a coating comprising a copolyamide moulding compound according to claim 1.

12. The moulded article according to claim 11 which is selected from the group consisting of correcting lenses, non-correcting lenses, sunglass lenses, spectacle bows, spectacle frames, safety glasses, visors, glasses, glass panes, clock glasses, lamp glass, protective helmets, handles, fasteners, textile fasteners, measuring instruments, flow meters, filter cups, eye protection, decorative parts, magnifying glasses, lens systems, camera lenses, LED lenses, displays, game consoles, cameras, laser devices, distance measuring devices, GPS devices, and apparatus housings.

13. A method for the production of moulded articles or coatings, correcting lenses, non-correcting lenses, sunglass lenses, spectacle bows, spectacle frames, safety glasses, visors, glasses, glass panes, clock glasses, lamp glass, protective helmets, handles, fasteners, textile fasteners, measuring instruments, flow meters, filter cups, eye protection, decorative parts, magnifying glasses, lens systems, camera lenses, LED lenses, displays, game consoles, cameras, laser-, distance measuring- or GPS devices, and apparatus housings comprising utilizing a copolyamide moulding compound in accordance with claim 1 in the manufacture of the articles or coatings.

14. The copolyamide moulding compound according to claim 1, having a glass transition temperature of 165 to 215° C.

15. The copolyamide moulding compound according to claim 1, having a stress-cracking resistance in toluene of at least 20 MPa.

16. The copolyamide moulding compound according to claim 1, having a breaking elongation of at least 30%.

17. The copolyamide moulding compound according to claim 1, having a modulus of elasticity in tension of at least 1,800 MPa.

* * * * *